Sept. 25, 1956
D. T. LANG
2,764,651
TEMPERATURE RESPONSIVE DEVICE
Filed Oct. 12, 1954
2 Sheets-Sheet 1
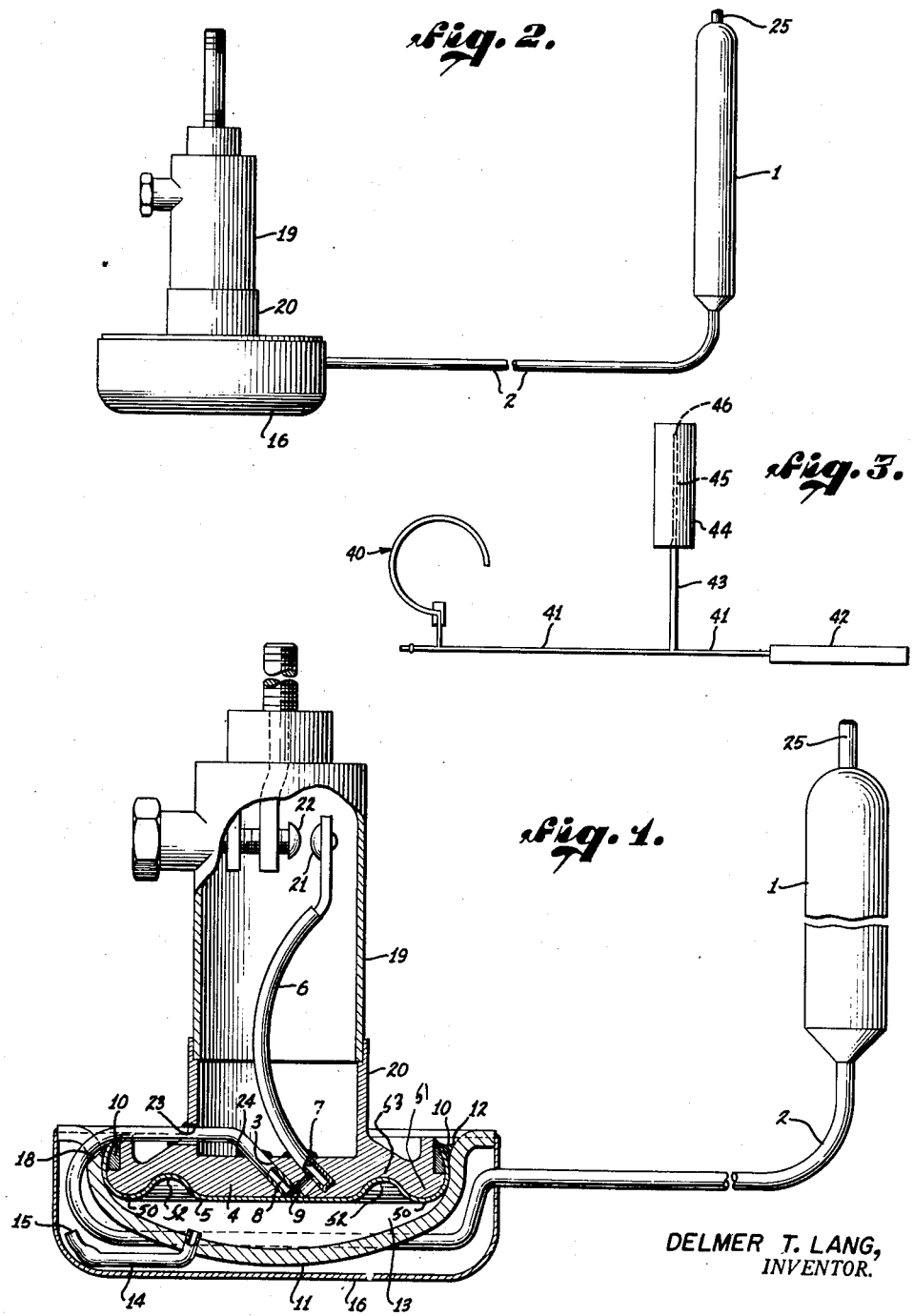
DELMER T. LANG,
INVENTOR.
BY Gerald H. Peterson
ATTORNEY Sept. 25, 1956          D. T. LANG          2,764,651
TEMPERATURE RESPONSIVE DEVICE
Filed Oct. 12, 1954                         2 Sheets-Sheet 2

DELMER T. LANG,
INVENTOR.

BY
Gerald H. Peterson
ATTORNEY

United States Patent Office 2,764,651
Patented Sept. 25, 1956

2,764,651

TEMPERATURE RESPONSIVE DEVICE

Delmer T. Lang, Palos Verdes Estates, Calif., assignor, by mesne assignments, to Walter Kidde-Pacific, a corporation of California Application October 12, 1954, Serial No. 461,828

14 Claims. (Cl. 200—140)

This invention relates to a temperature responsive device having as the temperature responsive element thereof a liquid under pressure in which device the rate of change of pressure is extraordinarily high with respect to changes in temperature and to a combination therewith providing an unusually large movement of the pressure responsive device with such changes in pressure.

Many temperature responsive devices are known which are used in a thermostat for controlling temperature of a system in accordance with a given temperature. For many uses, however, it is desirable or necessary to have in a thermostat a temperature responsive device which is highly sensitive to changes in temperature especially within a range of temperatures near the control temperature.

I have discovered, in accordance with my invention, that such a desirable temperature responsive device can be made which is highly sensitive to small changes of temperature within the range of temperatures near the control temperature and that within this temperature range the device is substantially "snap-acting," with respect to the liquid in the internal volume in the sense of a very high rate of change of pressure with temperature.

Accordingly, it is an object of my invention to provide a temperature responsive device, especially useful in a thermostat, which is highly sensitive to changes in temperature within a range of temperatures near the operating or control temperature and which, near the control temperature, is substantially snap-acting with respect to rate of change of liquid pressure with temperature.

Other advantages and objects of my invention will be apparent to those skilled in the art to which my invention relates from the description below.

Broadly, my invention comprises the combination of a liquid-locked liquid confined within a temperature-sensitive element such as a bulb, connected to a means, such as a Bourdon tube, movably responsive to changes in pressure within the internal volume of the system with substantially no change in internal volume. In this combination the internal volume of the system is filled with liquid under the condition of liquid lock, that is, liquid with no vapor or gas. That is, in this device the entire internal volume of temperature sensing bulb and Bourdon tube is filled with liquid-locked liquid with no vapor or gas so that the change of pressure of the internal volume varies with the thermal expansion of the liquid in accordance with the average temperature of the liquid in the internal volume. Especially since this system, in accordance with my invention, has a high rate of increase of pressure with increase of temperature, it preferably also has means for relieving any excessively high pressure developed in the liquid of the internal volume of the system to avoid damage to the temperature responsive system on overheating.

My invention will be illustrated and explained by the description below of a specific embodiment thereof taken in conjunction with the accompanying drawings in which:

Fig. 1 shows a device of my invention in cross-section.
Fig. 2 shows the device of Fig. 1 in elevation.

Fig. 3 shows a modification of my invention.

Figure 4:
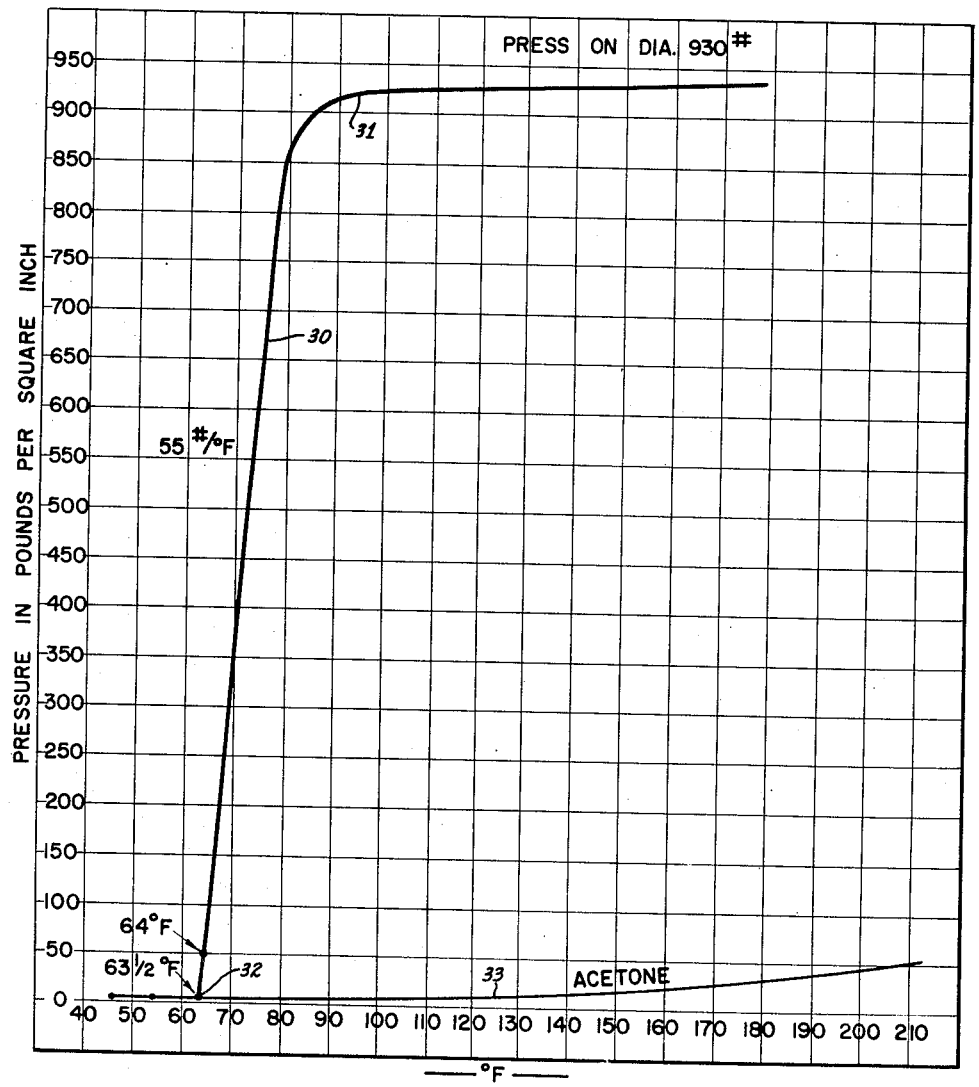
Fig. 4 shows a plot of pressure with temperature of the liquid in the internal volume of my device as shown in Fig. 3.

One specific embodiment of my invention will be described by particular reference to Fig. 1 in which is shown a temperature sensing bulb 1 connected by tube 2 extending through hole 3 in circular base member 4. Covering the bottom and sides of base 4 a diaphragm 5 is affixed to the base member by silver brazing around the periphery thereof as shown at 10. Into base member 4 Bourdon tube 6 is fixedly inserted by silver brazing as shown at 7. End 8 of tube 2 extends into the hole 3 in base 4 and communicates with hole 9 which in turn communicates with the interior of the Bourdon tube 6. Both tube 8 and hole 9 are open at the bottom to the upper surface of diaphragm 5 so that the pressure of the liquid within the tube 8, hole 9, tube 2 and bulb 1 is applied to the diaphragm 5 as well as to the Bourdon tube. The diaphragm 5 fits as snugly as possible against the bottom contours of the base member 4, as shown in the drawing, and is silver brazed around the periphery of this base member as shown at 10 to make a sealed gastight connection between the bottom of this base member 4 and the upper surface of the diaphragm 5. The diaphragm is made of 0.005" flexible stainless steel sheet, and has an annular rim 50 conforming to annular rim 51 of the base member 4 and annular groove 52 conforming to the annular groove 53 of the base member. Bulb 1, tubes 2 and 8, hole 9, and Bourdon tube 6 are completely filled with liquid under liquid lock condition so that the pressure within this internal volume varies in accordance with the thermal expansion of the liquid in accordance with the average temperature thereof.

On the outside of diaphragm 5 is a stainless steel pressure dome 11 which by silver brazing at 12 around the outer periphery of base member 4 is sealed to form a pressure container or chamber 13 about the outer surface of the diaphragm 5. This container is pressurized preferably with gas at the pressure at which diaphragm 5 will expand under the pressure of liquid in tube 8 and hole 9 to relieve excessive pressure on the internal volume of the temperature responsive system. Thus, gas may be introduced into container 13 by way of pipe 14 which is then sealed off as by soldering at 15.

The lower portion of the pressure dome may be enclosed in a housing 16 if desired. Tubing 2 extends through hole 18 in presure dome 11. This hole 18, however, is above the seal 12 between the pressure dome 11 and the portion of the diaphragm 5 sealed at 10 to the periphery of the base member 4.

The top surface of diaphragm 5 fits so snugly against bottom surface of base member 4 that there is substantially no liquid therebetween and the pressure in pressure chamber 13 is not transmitted into the liquid in the internal volume of Bourdon tube 6, opening 9, tube 8, tube 2 and bulb 1. Thus the internal volume pressure is independent of the pressure in pressure container 13 until the internal volume pressure becomes great enough to cause the diaphragm 5 to move. This arrangement for diaphragm 5 not only makes the internal volume pressure independent of the container or relief pressure up to an internal volume pressure approximately equal to the relief pressure but also, because of the relative small volume of liquid within the Bourdon tube 6, opening 9 and tube 8 and the absence of any liquid between the diaphragm 5 and base member 4, the whole device is relatively insensitive to any temperature other than the temperature of the bulb 1. To further reduce volume of liquid within the Bourdon tube the Bourdon tube is preferably filled with metal plugging strips, as known in the art, to reduce the volume of the Bourdon tube to less than about 10% of the unplugged Bourdon tube volume.

The Bourdon tube 6, from its rigid support in base member 4, extends upwardly into housing 19 which fits onto the upper portion 20 of the base member 4. The upper end of Bourdon tube 6, carries electrical contact 21 adapted to cooperate with electrical contact 22 to open and close an electrical circuit with movement of the Bourdon tube with variations in pressure of the liquid within the internal volume of the system as known and understood in the art.

The arrangement shown in Fig. 1 may be made by placing the Bourdon tube 6 within the slot or hole 7 by silver brazing. This fixes the Bourdon tube with respect to the base member 4. End 8 of tube 2 is then inserted through hole 23 in upwardly extending wall 20 of base member 4 and end 8 is bent and inserted in hole 3, which extends all the way through base member 4. End 8 of tube 2 is then silver brazed at 24 to hole 3 and then the end 8 is cut off flush with the bottom surface of base 4. Silver brazing of 7 and 24 is preferably done at the same time. Hole 9 is then drilled through the open portion of tube 8 through base member 4 through the Bourdon tube to communicate with the Bourdon tube. The bottom surface of base 4 having openings for hole 9 and tube 8 is then made smooth so that the diaphragm 5 can be made flush with the bottom surface of base 4. The diaphragm 5 is then placed to fit flush and in such smooth contact with the bottom of base 4 as is possible and sealed by silver brazing at 10 around the periphery of base 4. Pressure dome 11 is then placed in position and silver brazed as shown at 12 around the periphery of base 4. The silver brazing at 10 and 12 is preferably done at the same time.

In filling this unit with liquid in accordance with my invention connection may be made at tube 25 which connects with bulb 1. The internal volume of bulb 1, tube 2 and Bourdon tube 6 is preferably outgassed as much as possible and placed under a vacuum. Liquid, preferably also outgassed as much as possible, is then run into the internal volume under pressure. The pressure of the liquid should be sufficiently above the vapor pressure so that at normal temperature conditions to which the liquid is subjected in operation no vapor appears and the entire internal volume is filled with liquid in the liquid locked condition. Preferably to obtain the desired fill of liquid and adjust this device for operation at the same time, the pressure in chamber 13 against the outside of the diaphragm is first provided by pumping gas into this space 13 at the relief pressure which is safely above the pressure of operation and below the pressure of rupture or bursting of any of the parts.

For example, the pressure in 13 may be 930 pounds per square inch. If the thermostat is to be operated at 70° F. and the liquid is acetone, the internal volume will, for example, be filled with acetone at a pressure of 400 pounds per square inch, a pressure sufficiently high to assure liquid lock at and near the temperature of operation, and the contact points 21 and 22 of thermostat adjusted for operation at this pressure with the entire bulb 1 in a bath at the operating temperature of 70° F. It will be understood that the volume of the bulb is so much greater than the internal volume of tube 2 and Bourdon tube 6 that normal temperature variations of this small volume of liquid will have relatively little effect on the system. Thus, this system will be set to operate at 70° F. at an internal pressure of around 400 pounds per square inch and with a relief pressure of 930 pounds per square inch which is well above the operating pressure and yet safely below the rupture or bursting pressure of any of the elements of the device.

In operation the temperature sensing bulb 1 is subjected to the temperature with respect to which control is to be effected. At the control temperature the Bourdon tube, with increased pressure of the liquid in the internal volume of the system, moves contact 21 toward and in contact with point 22 to close an electrical circuit. This will take place, with increased pressure of the liquid in accordance with the adjustment for operation. In this arrangement, there is substantially no, or very limited, volume change of the internal volume of bulb, tube, and Bourdon tube with change in pressure; hence change in pressure is substantially all translated into movement of the Bourdon tube. That is, in accordance with my invention it is possible to transform small changes in temperature into large movements or torque of the Bourdon tube.

With the arrangement in accordance with my invention, the rate of change of pressure with temperature is so great that with only small amounts of overheating the pressure may rupture or burst some element of the system. However, in accordance with this embodiment of my invention, the pressure in 13 on the other side of diaphragm 5 is set at a value above the operating pressure to relieve such high pressure of overheating below rupture or bursting pressure. Thus, when the pressure of the liquid in the internal volume becomes greater than the gas pressure in 13, diaphragm 5 will move into space 13 to relieve the excess pressure on the liquid, without impairing or changing the operation of the liquid for its intended use at pressures below this relief pressure.

A modification of my invention is shown in Fig. 3. At 40 is shown a Bourdon tube connected to a tube 41, which tube 41 is connected to bulb 42. Extending from tube 41 is stainless steel tube 43. Tube 43 extends within pressure chamber 44 and within the pressure chamber 44 tube 43 is flattened as shown at 45 and sealed at its tip 46. Pressure chamber 44 surrounding the flattened portion 45 holds this portion of the tube 43 in flattened condition until the pressure within tube 43 and flattened portion 45 begins to equal the pressure in pressure chamber 44 at which time the flattened portion tends to become circular in cross section and in expanding enlarges the volume to provide a safety pressure release for the liquid in the internal volume of Bourdon tube 40, tube 41, bulb 42, tube 43 and its flattened portion 45.

Tube 43 is so flattened as shown at 45 that substantially no liquid is present within the flattened portion 45 of tube 43 so that the pressure within the pressure chamber 44 is not transmitted to the liquid within the internal volume of tube 43, tube 41, Bourdon tube 40 and bulb 42. With this arrangement the pressure on the internal volume is independent of the pressure in the pressure chamber 44 until the pressure of the liquid in the internal volume approaches the pressure in the pressure chamber 44 and the flattened portion 43 begins to expand against the pressure in the pressure chamber.

Fig. 4 shows a plot of the relationship between the pressure developed on the internal volume of this system of this particular embodiment of my invention, with acetone as the liquid, and with the bulb a stainless steel tube having an internal diameter of about 1 centimeter and having an internal volume of 17 cubic centimeters connected to a Bourdon tube by way of tube 41 with the Bourdon tube and tube 41 having a volume of only about 0.1 cubic centimeters. The temperature plotted is the temperature of the bulb and its internal liquid. The pressure plotted is the pressure of this internal liquid as measured by movement of the Bourdon tube. This system was filled with acetone and adjusted to operate at a temperature of 70° F. at an internal pressure of 400 pounds per square inch with the bulb at 70° F. In Fig. 4, curve 30 shows the relationship between the temperature of the bulb and the resulting pressure. The curve represents results of measurements. With a nitrogen pressure of 930 pounds per square inch in pressure chamber 44 the flattened portion 45 begins to relieve the pressure on the liquid as shown at 31 on the curve in Fig. 4 so that the pressure in the internal volume does not rise above 930 pounds per square inch as relieved by the flattened portion 45. Curve 33 shows the relationship between the vapor pressure of acetone and its temperature. At point 32 corresponding with a temperature of about 63.5° F. the liquid in this system is just at the point of transition from the condition of liquid lock to the condition where below said temperature of 63.5° F. the pressure varies in accordance with the vapor pressure of the liquid in accordance with its average temperature. The device of my invention uses particularly that portion of the curve from point 32 to portion 31. It will be noted that this portion of the curve is very steep and represents a rate change of pressure with temperature of about 55 pounds per square inch per degree Fahrenheit. Thus it will be seen that within the range of temperatures of about 63° to 80° F., which embraces the control point of 70° F., my device is exceedingly and eminently sensitive to small changes in temperature.

It is an important consideration in accordance with my invention that, in addition to the presence, at the operating temperature, of liquid under the liquid lock condition in the internal volume of temperature sensing bulb and pressure responsive means such as Bourdon tube, the resulting change in internal volume of this liquid with change in temperature is translated as much as possible and to a surprising extent into movement of the Bourdon tube so that maximum movement of the Bourdon tube is obtained per unit change in temperature. Since the Bourdon tube movement depends on the change in pressure, the change in pressure is representative of the movement of the Bourdon tube in any particular system in accordance with my invention, as indicated, for example, in Fig. 4. It should be noted especially that in accordance with my invention the volume change with change in temperature is substantially all translated into movement of the Bourdon tube. Thus, my invention clearly distinguishes from a system in which a bellows is used, instead of a Bourdon tube in the combination, because the change in volume of a bellows with the change in volume of the liquid with thermal expansion does not produce sufficient movement of the temperature responsive device as is produced in accordance with my invention. This arises in accordance with my invention chiefly because there is substantially no, or only very limited, change of internal volume of my system with changes in temperature of the liquid. It will be understood, of course, that such factors as compressibility of the liquid with increase in pressure and some slight expansion of the temperature sensing bulb and Bourdon tube are operating in all systems to slightly reduce the movement of the temperature responsive device, but in accordance with my invention the movement of the temperature responsive device, especially for use in operating a thermostat, is exceedingly and surprisingly high per unit change of temperature of the temperature sensing bulb. In this connection it is preferred in accordance with my invention to select a liquid which, for the conditions of operation, has a satisfactorily high pressure change with temperature in this system. However, in accordance with my invention it is possible to take the greatest advantage of such pressure change of any liquid to produce a surprisingly high effective and useful movement of the temperature responsive device, especially for use in a thermostat, particularly for operating electrical contact points or snap acting electrical switches, especially those known in the art as microswitches.

It is preferred that in the device in accordance with my invention that the internal volume of the temperature sensing bulb be sufficiently large with respect to the rest of the internal volume so that the device is substantially entirely sensitive to changes in temperature of the bulb and relatively unaffected by changes in temperature of the Bourdon tube. Usually the volume of the bulb will be at least 90 per cent of of the internal volume of the system.

This application is a continuation-in-part of my copending application Serial No. 300,720, filed July 24, 1952.

The specific embodiments given above are for the purpose of illustrating my invention, and it will be readily understood that my invention includes other modifications within the scope of the following claims.

I claim:

1. In a temperature responsive device, the combination comprising a temperature sensing element and a Bourdon tube the internal volume of which is entirely filled with liquid in the liquid lock condition and at a pressure above the vapor pressure of said liquid at the operating temperature so that changes of pressure of said liquid vary with the thermal expansion of said liquid in accordance with the average temperature thereof.

2. In a temperature responsive device, the combination comprising a temperature sensing element and a Bourdon tube the internal volume of which is entirely filled with liquid in the liquid lock condition at the operating temperature so that changes of pressure of said liquid vary with the thermal expansion of said liquid in accordance with the average temperature thereof, and means for relieving excessive pressure developed on said liquid within said internal volume to avoid damage to said device arising from such excessive pressure.

3. In a temperature responsive device, the combination comprising a temperature sensing element filled with liquid and means connected thereto responsive to changes of pressure of said liquid with changes of temperature thereof, said means being so responsive to said changes of pressure with substantially no change of internal volume thereof, said liquid within the internal volume of said sensing element and means being in the liquid lock condition at the operating temperature so that changes of pressure of said liquid vary with the thermal expansion of said liquid in accordance with the average temperature thereof, and means for relieving excessive pressure developed on said liquid within said internal volume to avoid damage to said device arising from such excessive pressure.

4. In a temperature responsive device, the combination comprising a temperature sensing element and a Bourdon tube the internal volume of which is entirely filled with liquid in the liquid lock condition at the operating temperature so that changes of pressure of said liquid vary with the thermal expansion of said liquid in accordance with the average temperature thereof, and means for relieving excessive pressure developed on said liquid within said internal volume to avoid damage to said device arising from such excessive pressure comprising a diaphragm, one side of which is on contact with the pressure of said liquid and the other side of which is subjected to gas under the pressure at which said means relieves said excessive pressure.

5. In a temperature responsive device, the combination comprising a temperature sensing element and a Bourdon tube the internal volume of which is entirely filled with liquid in the liquid lock condition at the operating temperature so that changes of pressure of said liquid vary with the thermal expansion of said liquid in accordance with the average temperature thereof, and means for relieving excessive pressure developed on said liquid within said internal volume to avoid damage to said device arising from such excessive pressure, said means comprising a diaphragm subject to said liquid pressure on one side and on the other side subject to the relief pressure, said diaphragm being movable to release the pressure on said liquid when it becomes greater than the pressure on the other side of said diaphragm.

6. In a temperature responsive device, the combination comprising a temperature sensing element and a Bourdon tube the internal volume of which is entirely filled with liquid in the liquid lock condition at the operating temperature so that changes of pressure of said liquid vary with the thermal expansion of said liquid in accordance with the average temperature thereof, and means for relieving excessive pressure developed on said liquid within said internal volume to avoid damage to said device arising from such excessive pressure, said means comprising a flattened portion of a tube within a pressure chamber, said flattened portion adapted to expand and relieve the pressure on said liquid when it becomes greater than the pressure in said pressure chamber.

7. In a temperature responsive device, the combination comprising a temperature sensing element and a Bourdon tube the internal volume of which is entirely filled with liquid in the liquid lock condition at the operating temperature so that changes of pressure of said liquid vary with the thermal expansion of said liquid in accordance with the average temperature thereof, the internal volume of said temperature sensing element being at least 90 percent of the internal volume of the system consisting of said Bourdon tube and said temperature sensing element.

8. In a temperature responsive device, the combination comprising a temperature sensing element filled with liquid and means connected thereto responsive to changes of pressure of said liquid with changes of temperature thereof with substantially no change of internal volume thereof, the internal volume of said element and said means being entirely filled with liquid in the liquid lock condition and at a pressure above the vapor pressure of said liquid at the operating temperature of said temperature responsive device so that changes of pressure of said liquid vary with the thermal expansion of said liquid in accordance with the average temperature thereof.

9. A temperature responsive device as defined in claim 8 having means for relieving excessive pressure developed on said liquid within said internal volume to avoid damage to said device arising from such excessive pressure.

10. A temperature responsive device as defined in claim 8 having means for relieving excessive pressure developed on said liquid within said internal volume to avoid damage to said device arising from such excessive pressure comprising a diaphragm, one side of which is on contact with the pressure of said liquid and the other side of which is subjected to gas under the pressure at which said means relieves said excessive pressure.

11. A temperature responsive device as defined in claim 8 having means for relieving excessive pressure developed on said liquid within said internal volume to avoid damage to said device arising from such excessive pressure, said means comprising a diaphragm subject to said liquid pressure on one side and on the other side subject to the relief pressure, said diaphragm being movable to release the pressure on said liquid when it becomes greater than the pressure on the other side of said diaphragm.

12. A temperature responsive device as defined in claim 8 having means for relieving excessive pressure developed on said liquid within said internal volume to avoid damage to said device arising from such excessive pressure, said means comprising a flattened portion of a tube within a pressure chamber, said flattened portion adapted to expand and relieve the pressure on said liquid when it becomes greater than the pressure in said pressure chamber.

13. A temperature responsive device as defined in claim 8 in which the internal volume of said temperature sensing element is at least 90 percent of the internal volume of the system consisting of said means and said temperature sensing element.

14. A temperature responsive device as defined in claim 3 in which said means for relieving excessive pressure relieves said excessive pressure without any substantial drop in pressure of said liquid at the pressure value at which said relief is effected.

References Cited in the file of this patent

UNITED STATES PATENTS

| | | |
|---|---|---|
| 2,417,860 | Cline | Mar. 25, 1947 |
| 2,420,282 | Bowditch | May 6, 1947 |